(12) United States Patent
Disciascio et al.

(10) Patent No.: US 10,171,619 B2
(45) Date of Patent: Jan. 1, 2019

(54) IDENTIFYING A CLOUD SERVICE USING MACHINE LEARNING AND ONLINE DATA

(71) Applicant: CA, Inc., Islandia, NY (US)

(72) Inventors: Dave Disciascio, Moon, PA (US); Olga Lagunova, Butler, PA (US)

(73) Assignee: CA, Inc., New York, NY (US)

( * ) Notice: Subject to any disclaimer, the term of this patent is extended or adjusted under 35 U.S.C. 154(b) by 402 days.

(21) Appl. No.: 14/470,988

(22) Filed: Aug. 28, 2014

(65) Prior Publication Data
US 2016/0065436 A1   Mar. 3, 2016

(51) Int. Cl.
| | |
|---|---|
| H04L 12/26 | (2006.01) |
| H04L 29/08 | (2006.01) |
| H04W 4/60 | (2018.01) |
| H04W 4/00 | (2018.01) |
| G06F 15/16 | (2006.01) |

(52) U.S. Cl.
CPC .............. *H04L 67/32* (2013.01); *H04L 67/10* (2013.01); *H04W 4/003* (2013.01); *H04W 4/60* (2018.02); *G06F 15/16* (2013.01); *H04L 43/00* (2013.01)

(58) Field of Classification Search
None
See application file for complete search history.

(56) References Cited

U.S. PATENT DOCUMENTS

| | | | |
|---|---|---|---|
| 9,705,758 B2 | 7/2017 | Anderson et al. | |
| 2009/0240638 A1* | 9/2009 | Kirpal | G06F 17/30887 706/12 |
| 2011/0219434 A1* | 9/2011 | Betz | G06F 21/00 726/5 |
| 2012/0254960 A1* | 10/2012 | Lortz | H04L 63/104 726/7 |
| 2012/0296638 A1* | 11/2012 | Patwa | G06F 17/30654 704/9 |
| 2012/0324113 A1* | 12/2012 | Prince | H04L 67/2814 709/226 |
| 2013/0097356 A1* | 4/2013 | Dang | G06F 9/455 711/6 |
| 2013/0117157 A1 | 5/2013 | Iyoob et al. | |
| 2013/0204997 A1* | 8/2013 | Eggleston | H04L 41/5009 709/223 |
| 2013/0347068 A1* | 12/2013 | Elleboe | H04L 63/101 726/3 |

(Continued)

OTHER PUBLICATIONS

Related U.S. Appl. No. 14/471,010; entitled "Identifying a Cloud Service Using Network Traffic and Other Data"; filed Aug. 28, 2014 by Steven L. Greenspan.

(Continued)

*Primary Examiner* — Viet D Vu
*Assistant Examiner* — James A Edwards
(74) *Attorney, Agent, or Firm* — Meyertons, Hood, Kivlin, Kowert & Goetzel, P.C.

(57) ABSTRACT

Analyzing network traffic includes identifying, by a computer related to an enterprise, an endpoint outside of the enterprise of a network connection between a resource of the enterprise and the endpoint; and autonomically determining, by the computer related to the enterprise, when the endpoint is associated with a cloud service provider. An indication that the endpoint is associated with the cloud service provider can then be stored by the computer related to the enterprise.

15 Claims, 3 Drawing Sheets

(56) References Cited

U.S. PATENT DOCUMENTS

2014/0164166 A1* 6/2014 Akolkar ............ G06Q 30/0627
  705/26.4
2015/0195347 A1 7/2015 Luft

OTHER PUBLICATIONS

Netskope; Netskope Active Cloud DLP; 01/14 DS-10-1; Active Cloud DLP Datasheet; pp. 1-3; Los Altos, CA.
Netskope; The Netskope Active Platform; 06/14 DS-1-4; Product Datasheet; pp. 1-3; Los Altos, CA.
Skyhigh Networks, Inc.; Skyhigh—Analyze; https://web.archive.org/web/20140803094201/hht://www.skyhighnetworks.com/product/skyhigh-analyze; Aug. 3, 2014; pp. 1-13.
Skyhigh Networks, Inc.; Skyhigh—Discover; https://web.archive.org/web/20140803094235/hht://www.skyhighnetworks.com/product/skyhigh-discover; Aug. 3, 2014; pp. 1-12.
Skyhigh Networks, Inc.; Skyhigh—Secure; https://web.archive.org/web/20140803094214/hht://www.skyhighnetworks.com/product/skyhigh-secure; Aug. 3, 2014; pp. 1-13.
Cloud Services Overview—Spiceworks; http://community.spiceworks.com/help/Cloud_Services_Overview; Jul. 22, 2014; Spiceworks Inc.; pp. 1-4.
Robinson, Allison Michelle; Non-final Office Action; U.S. Appl. No. 14/471,010; Sep. 25, 2017; United States Patent and Trademark Office; Alexandria, Virginia.

* cited by examiner

IDENTIFYING A CLOUD SERVICE USING MACHINE LEARNING AND ONLINE DATA

BACKGROUND

The present disclosure relates to computer resource tracking and, more specifically, to analyzing network traffic.

Cloud computing providers offer their services according to several fundamental models: infrastructure as a service (IaaS), platform as a service (PaaS), and software as a service (SaaS) where IaaS is the most basic and each higher model abstracts from the details of the lower models. In the most basic cloud-service model, providers of IaaS offer computers—physical or virtual machines—and other resources.

For example, a hypervisor can run various virtual machines as guests and pools of hypervisors within the cloud operational support-system can support large numbers of virtual machines and the ability to scale services up and down according to customers' varying requirements. IaaS clouds often offer additional resources such as a virtual-machine disk image library, raw block storage, and file or object storage, firewalls, load balancers, IP addresses, virtual local area networks (VLANs), and software bundles. IaaS-cloud providers supply these resources on-demand from their large pools installed in data centers.

To deploy their applications, cloud users install operating-system images and their application software on the cloud infrastructure. In this model, the cloud user patches and maintains the operating systems and the application software. Cloud providers typically bill services (e.g., IaaS, SaaS, etc.) on a utility computing basis wherein the cost reflects the amount of resources allocated and consumed.

As cloud service usage grows in many business and enterprises, these organizations may benefit from identifying how much and how often cloud services are being utilized by personnel within the organization.

BRIEF SUMMARY

According to one aspect of the present disclosure, a method for analyzing network traffic includes identifying, by a computer related to an enterprise, an endpoint outside of the enterprise of a network connection between a resource of the enterprise and the endpoint; and autonomically determining, by the computer related to the enterprise, when the endpoint is associated with a cloud service provider. The method also includes storing, by the computer related to the enterprise, an indication that the endpoint is associated with the cloud service provider.

According to another aspect of the present disclosure, a system of an enterprise for analyzing network traffic includes a computer processor and a memory in communication with the computer processor storing instructions. The instructions, when executed by the computer processor cause the system to: identify an endpoint outside of the enterprise of a network connection between a resource of the enterprise and the endpoint; autonomically determine when the endpoint is associated with a cloud service provider; and store an indication that the endpoint is associated with the cloud service provider.

According to another aspect of the present disclosure, a computer program product for analyzing network traffic includes a non-transitory computer readable storage medium having computer readable program code embodied therewith. In particular, the computer readable program code includes a) computer readable program code for identifying an endpoint outside of an enterprise of a network connection between a resource of the enterprise and the endpoint; b) computer readable program code for autonomically determining when the endpoint is associated with a cloud service provider; and c) computer readable program code for storing an indication that the endpoint is associated with the cloud service provider.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
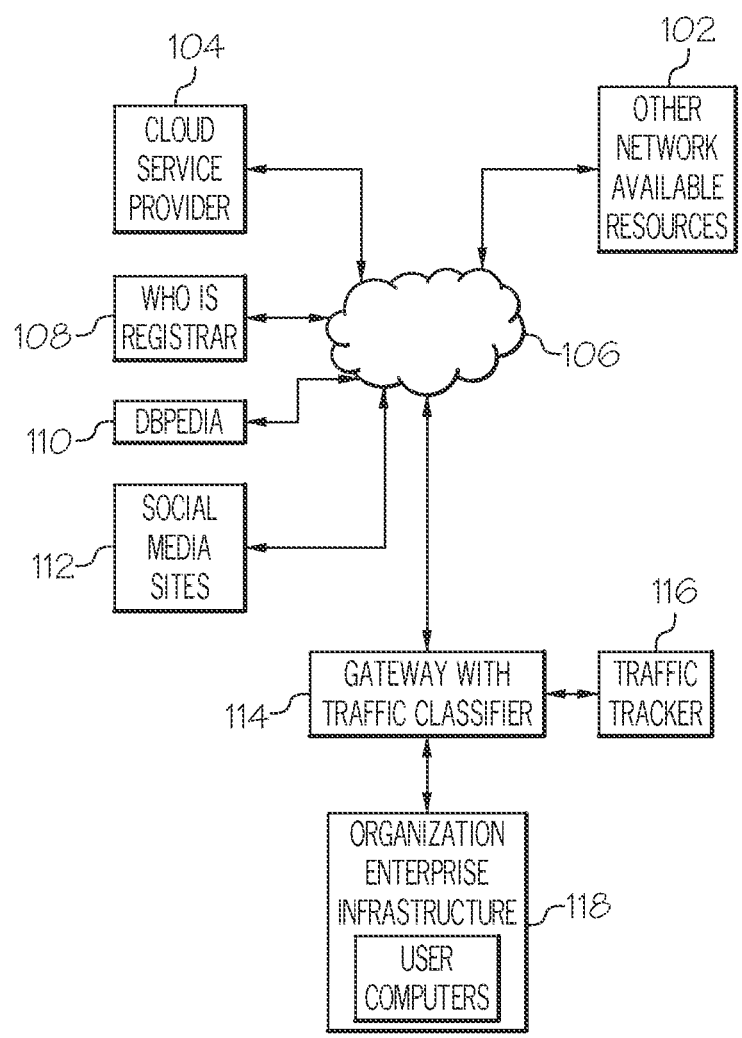
FIG. 1 illustrates an example computing environment in which a network analysis framework can be deployed in accordance with the principles of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or by combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CORaM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

FIG. 1 illustrates an example computing environment in which a network analysis framework can be deployed in accordance with the principles of the present disclosure. An organization has an enterprise infrastructure 118 that includes a number of computing devices and users. These computing devices can include, for example, such resources as general purpose computers, tablets, devices, phones, laptops, printers, scanners, network-attached storage, and network infrastructure. A common capability of these computing devices is an ability to communicate through a network 106 with other computing resources. For example, other network-attached resources 102 may be available to communicate with the enterprise infrastructure 118.

One type of resource that can be communicated with through the network 106 is a cloud service provider 104. Such a provider 104 can provide IaaS, PaaS, and/or SaaS that can be utilized by one or more users or devices within the enterprise infrastructure 118.

In many organizations a gateway system or component may be located between the enterprise infrastructure 118 and the network 106 such that most, or all, network traffic to and from the infrastructure 118 passes through that gateway. One of ordinary skill will recognize that such a gateway can be a single component or a distributed plurality of systems that cooperatively perform the functions of the gateway.

In FIG. 1, in accordance with the principles of the present disclosure, the gateway 114 is depicted as including a component that performs network traffic classification. The network-traffic classifier/gateway 114 is located relative to the infrastructure 118 so that it can have access to network traffic to and from the infrastructure 118. As explained in more detail below, the network-traffic classifier 114 can analyze the network traffic to determine communications involving cloud services such as those involving the cloud service provider 104. Along with analyzing network traffic, the network-traffic classifier 114 can communicate analysis results to a traffic tracking component 116.

Additionally, a variety of information resources are available and accessible through the network 106. The resources 108, 110, 112 shown in FIG. 1 are provided merely by way of example and are meant to represent the wide variety of information that can be used in accordance with the principles of the present invention.

For example, a WHOIS registrar 108 can be queried to determine an association between an organization, one or more IP addresses, one or more uniform Resource Identifiers (URIs), and one or more domain names. Resources, similar to DBpedia 110, allow users to query relationships and properties associated with Wikipedia resources, including links to other related datasets. A wide variety of social media sites 112 also exist that can be automatically queried by a computer system to identify publicly-available information about organizations, web sites, enterprises and individuals.

Figure 2:
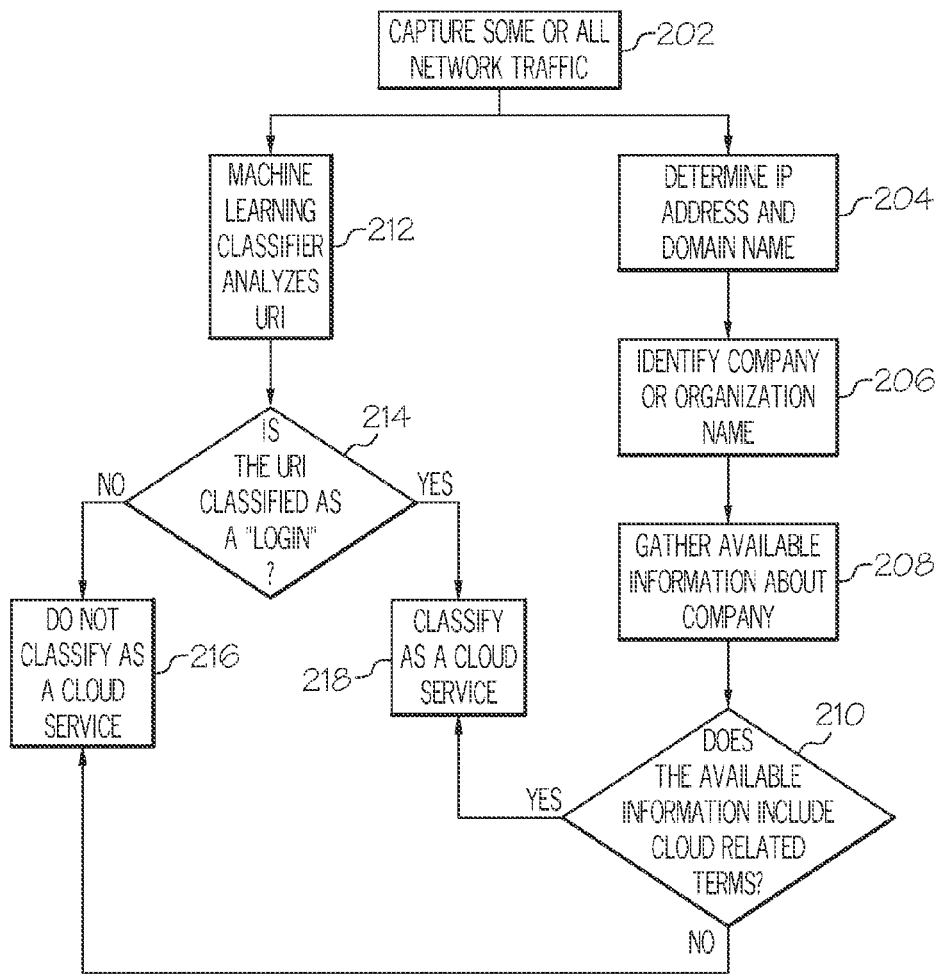
FIG. 2 illustrates a flowchart of an example network traffic classifier in accordance with the principles of the present disclosure.

FIG. 2 illustrates a flowchart of an example network traffic classifier in accordance with the principles of the present disclosure. The various steps and functions depicted in FIG. 2 are performed automatically or autonomously by a programmed computer system without requiring human interaction and, therefore, can scale to large enterprises and organizations where network traffic patterns can change quickly and involve large amounts of data. Thus, in step 202 a network traffic analyzer/classifier can capture network traffic of the enterprise infrastructure as an initial step. The network traffic of particular interest to an organization can include traffic involving a network connection between a resource of the enterprise infrastructure 118 and an endpoint (e.g., 104) outside of the enterprise infrastructure 118.

Not all of the network traffic of the enterprise necessarily needs to be capture and analyzed. For example, various filters can be applied to the enterprise's network traffic to capture traffic only within a connection having an endpoint outside of the enterprise. Additionally, that subset of traffic can be further filtered based on various traffic attributes such as the communication protocol (e.g., whether or not it is encrypted). For example, traffic utilizing "https" instead of merely using "http" may be of more interest and thus the traffic captured in step 202 for further analysis can be limited to "https" traffic.

One goal of capturing network traffic in step 202 is to identify a URI or IP address of an endpoint outside the enterprise being communicated with over a network connection. As shown in FIG. 2, a URI can be passed to a machine learning classifier that analyzes, in step 212, the URI. The URI can also be used in step 204 to determine an IP address and/or domain name associated with that URI.

In step 206, the domain name and/or IP address can be used to discover information about the organization associated with that domain name. For example, the network classifier 114 can automatically query a WHOIS registrar (or other registrar) 108 to identify a "Registrant Name", for example. Steps 202-206 can occur independently for a number of different network connection endpoints and, therefore, result in a number of different organization names being discovered in step 206. Those organization names represent a pool of potential cloud services with which enterprise computers are communicating.

The URI and the organization name for a particular endpoint can be used, in step 208, to query information resources on the Internet to identify additional information about the endpoint. In response to queries of one or more structure information sources or general search engines, a variety of documents and data will be returned that can be lexically analyzed for common words and concepts. For example, a SPARQL query against DBpedia using the organization name and URI will return an ontology from which keywords can be automatically extracted. In addition, social media sites such as LinkedIn and Facebook may also be queried for information about an endpoint.

Thus, in step 210, the information gathered in step 208 is analyzed to determine if words or phrases typically related to cloud services are present. For example, if the gathered information includes: "cloud", "cloud provider", "SaaS", "software as a service", "PaaS", "IaaS", etc., then the particular endpoint can be classified as a cloud service provider, in step 218. One of ordinary skill will recognize that various techniques for lexically analyzing datasets can be used which rely on a variety of factors such as the presence of keywords, the semantic context of keywords, the proximity of keywords near one another, the number of occurrences of keywords, etc.

Returning to step 212, the URI itself may provide evidence that an endpoint is a cloud service provider. A "machine learning" classifier can be used in step 212 to analyze the URI and classify the endpoint as either a cloud service provider or not.

One of ordinary skill will recognize, machine learning, a branch of artificial intelligence, involves systems that can learn from data. For example, in accordance with the principles of the present disclosure, a machine learning system could be trained on network traffic (e.g., packet contents, IP addresses, keywords, URIs, etc.) to learn to distinguish traffic involving an endpoint that is a cloud service and traffic that involves endpoints that are not cloud services. After learning, the system can then be used to classify new network traffic samples into one of the two type of traffic. A variety of different machine learning techniques and algorithms can be used without departing from the scope of the present disclosure.

As an example, the classifier can be trained on a variety of endpoint URIs that include both non-cloud related services and cloud related services. For example, "https://login.salesforce.com" and "https://www.dropbox.com/login" are examples of cloud related services and both include "login" with the URI. Similar phrases like "signin" or the like will add additional weight that a URI is related to a cloud service and step 214 determines if the URI is a "login" URI. Based on the determination in step 214, the URI (i.e., the endpoint) is classified as either a cloud service (step 218) or not a cloud service (step 216). Those endpoints classified as a cloud service provider have an associated indicator stored by the traffic classifier that indicates that the endpoint is a cloud service provider.

Figure 3:
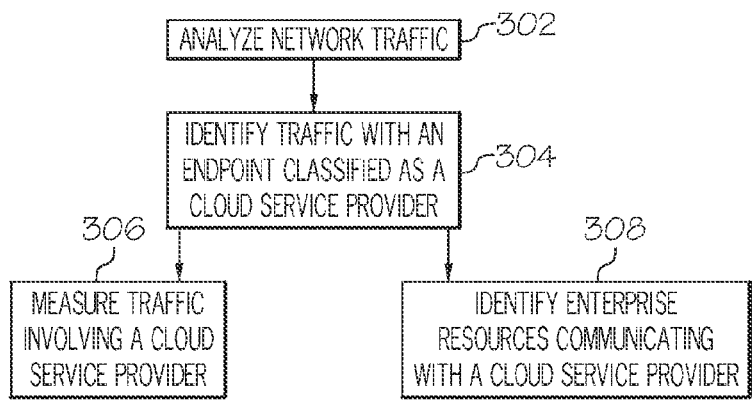
FIG. 3 illustrates a flowchart of an example network traffic tracker in accordance with the principles of the present disclosure.

FIG. 3 illustrates a flowchart of an example network traffic tracker in accordance with the principles of the present disclosure. Once an endpoint is classified as a cloud service provider, then network traffic involving that endpoint can be tracked. For example, the source IP address (within the enterprise) of traffic involving the cloud service endpoint can be compared to an enterprise's asset management database to determine an owner of the enterprise resource accessing the cloud service. Thus, information about the number and the roles of the enterprise users interacting with a cloud service can be determined.

Thus, the operation of the traffic classifier 114 described in relation to FIG. 2 can have additional functionality associated with a traffic tracker 116. The network classifier can, in step 302, analyze traffic and identify, in step 304, if an indicator exists that the endpoint has already been classified as a cloud service provider. If not, then the classifier can examine the endpoint as described above with respect to FIG. 2. However, if the endpoint has already been classified as a cloud service provider, then its URI and/or IP address need not be further analyzed for classification purposes. Instead, the traffic involving this endpoint can be further analyzed for additional information. For example, in step 306, an amount of traffic involving the cloud service provider can be measured and tracked. Such information may allow an enterprise to determine characteristics about how its computing resources are being used. In step 308, the traffic involving this endpoint can be analyzed to determine which particular resources within an enterprise are communicating with the cloud service provider.

Figure 4:
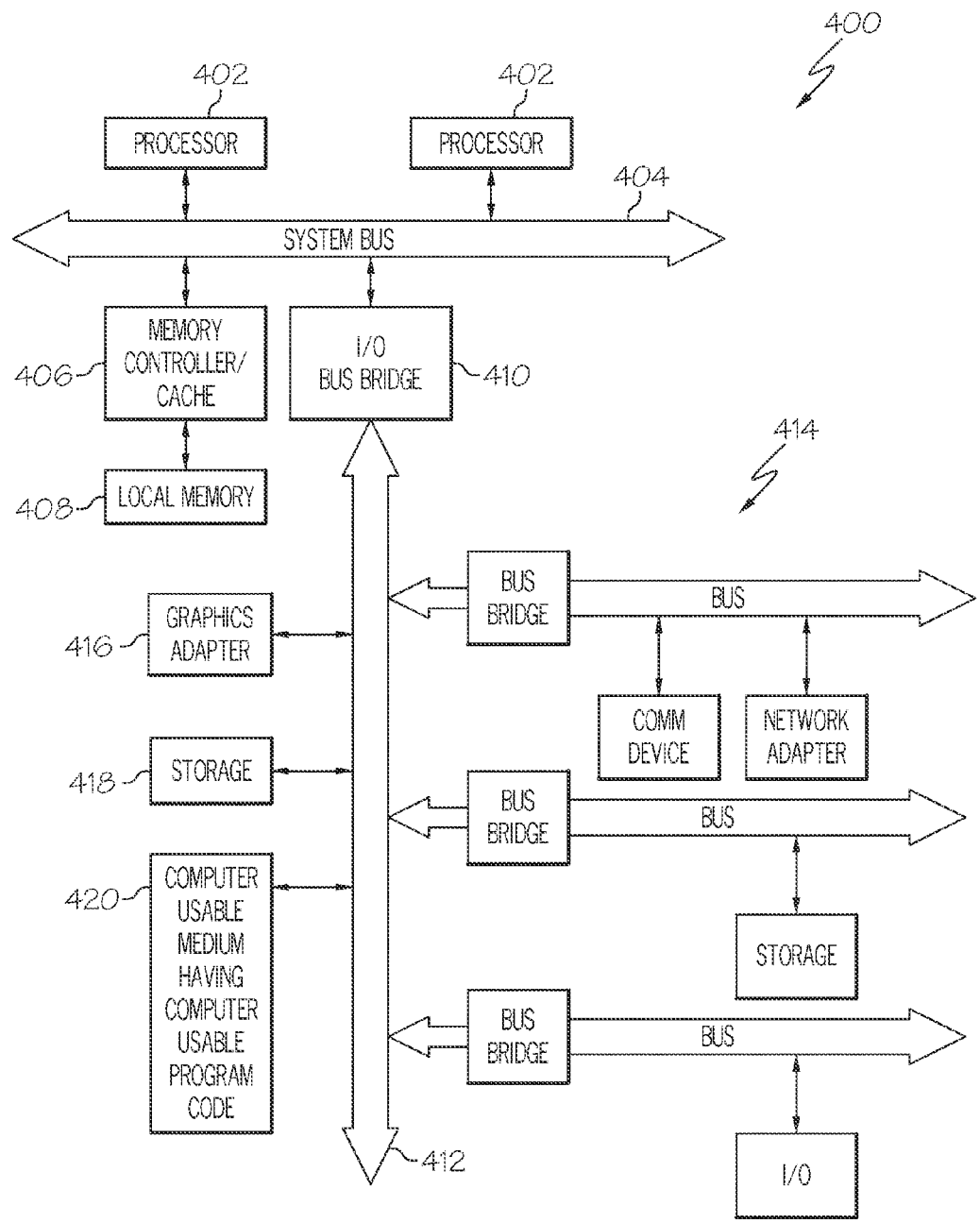
FIG. 4 is a block diagram of a data processing system in accordance with the principles of the present disclosure.

Referring to FIG. 4, a block diagram of a data processing system is depicted in accordance with the present disclosure. A data processing system 400, such as may be utilized to implement the hardware platform 102 or aspects thereof, e.g., as set out in greater detail in FIG. 1-FIG. 3, may comprise a symmetric multiprocessor (SMP) system or other configuration including a plurality of processors 402 connected to system bus 404. Alternatively, a single processor 402 may be employed. Also connected to system bus 404 is memory controller/cache 406, which provides an interface to local memory 408. An I/O bridge 410 is connected to the system bus 404 and provides an interface to an I/O bus 412. The I/O bus may be utilized to support one or more buses and corresponding devices 414, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 416, storage 418 and a computer usable storage medium 420 having computer usable program code embodied thereon. The computer usable program code may be executed to execute any aspect of the present disclosure, for example, to implement aspect of any of the methods, computer program products and/or system components illustrated in FIG. 1-FIG. 3.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method for analyzing network traffic, comprising:
   identifying, by a computer related to an enterprise, an endpoint outside of the enterprise of a network connection between a resource of the enterprise and the endpoint;
   analyzing, by the computer related to the enterprise, first network traffic of the network connection;
   based on analysis of the first network traffic, determining, by the computer related to the enterprise, whether the endpoint is a cloud service provider;
   wherein the determining comprises:
      automatically determining an address of the endpoint, wherein the address is one of a uniform resource identifier or IP address;
      automatically accessing a registrar computer system to identify an organization name related to the address of the endpoint;
      sending an automatically-generated first query to a first network-accessible data source that is associated with an online knowledgebase, wherein the automatically-generated first query is based on the organization name;
      receiving, from the first network-accessible data source, a first reply in response to the automatically-generated first query, wherein the first reply includes a first dataset of words;
      performing a textual analysis of the address of the endpoint and the first dataset of words to determine whether one or more of a set of words related to cloud services are present in the address or the first dataset of words; and
      based on the textual analysis, classifying the endpoint as being associated with a cloud service provider; and
   storing, by the computer related to the enterprise, an indication that the endpoint is associated with a cloud service provider.

2. The method of claim 1, wherein
classifying the endpoint as being associated with a cloud service provider includes analyzing the address of the endpoint with a previously trained machine learning classifier, wherein the classifying is based on the analyzing.

3. The method of claim 1, wherein the network connection comprises an encrypted communication scheme.

4. The method of claim 1, wherein the first network-accessible data source responds to dbpedia queries.

5. The method of claim 1, comprising:
identifying subsequent network traffic involving communication between the endpoint and any resource of the enterprise.

6. The method of claim 5, comprising:
determining an amount of the subsequent network traffic.

7. The method of claim 5, comprising:
determining those resources of the enterprise involved in the subsequent network traffic.

8. A system of an enterprise for analyzing network traffic, comprising:
   a memory storage device;
   a processor configured to execute instructions stored in the memory storage device, the instructions when executed by the processor cause the system to:
      identify an endpoint outside of the enterprise of a network connection between a resource of the enterprise and the endpoint, wherein the resource of the enterprise is separate from the system of the enterprise;
      analyze first network traffic of the network connection;
      determine, based on analysis of the first network traffic, whether the endpoint is a cloud service provider;
         wherein the determining comprises:
            automatically determining an address of the endpoint, wherein the address is one of a uniform resource identifier or IP address;
            automatically accessing a registrar computer system to identify an organization name related to the address of the endpoint;

sending an automatically-generated first query to a first network-accessible data source that is associated with an online knowledgebase, wherein the automatically-generated first query is based on the organization name;

receiving, from the first network-accessible data source, a first reply in response to the automatically-generated first query, wherein the first reply includes a first dataset of words;

performing a textual analysis of the address of the endpoint and the first dataset of words to determine whether one or more of a set of words related to cloud services are present in the address or the first dataset of words;

based on the textual analysis, classifying the endpoint as being associated with a cloud service provider; and store an indication that the endpoint is associated with a cloud service provider.

9. The system of claim 8, wherein the instructions, when executed by the processor, cause the system to:

classify the endpoint as being associated with a cloud service provider includes analyzing the address of the endpoint with a previously trained machine learning classifier, wherein the classifying is based on the analyzing.

10. The system of claim 8, wherein the network connection comprises an encrypted communication scheme.

11. The system of claim 8, wherein the first network-accessible data source responds to dbpedia queries.

12. The system of claim 8, wherein the instructions, when executed by the processor, cause the system to:

identify subsequent network traffic involving communication between the endpoint and any resource of the enterprise.

13. The system of claim 12, wherein the instructions, when executed by the processor, cause the system to:

determine an amount of the subsequent network traffic.

14. The system of claim 12, wherein the instructions, when executed by the processor, cause the system to:

determine those resources of the enterprise involved in the subsequent network traffic.

15. A computer program product for analyzing network traffic, comprising:

a non-transitory computer readable storage medium having computer readable program code embodied therewith, the computer readable program code comprising:

computer readable program code for identifying an endpoint outside of an enterprise of a network connection between a resource of the enterprise and the endpoint;

computer readable program code for analyzing first network traffic of the network connection;

computer readable program code for determining whether the endpoint is a cloud service provider, based on analysis of the first network traffic;

wherein determining comprises:

automatically determining an address of the endpoint, wherein the address is one of a uniform resource identifier or IP address;

automatically accessing a registrar computer system to identify an organization name related to the address of the endpoint;

sending an automatically-generated first query to a first network-accessible data source that is associated with an online knowledgebase, wherein the automatically-generated first query is based on the organization name;

receiving, from the first network-accessible data source, a first reply in response to the automatically-generated first query, wherein the first reply includes a first dataset of words;

performing a textual analysis of the address of the endpoint and the first dataset of words to determine whether one or more of a set of words related to cloud services are present in the address or the first dataset of words; and based on the textual analysis, classifying the endpoint as being associated with a cloud service provider; and computer readable program code for storing an indication that the endpoint is associated with a cloud service provider.

* * * * *